United States Patent [19]
Wolfe

[11] 4,084,448
[45] Apr. 18, 1978

[54] ESCAPEMENT ASSEMBLY FOR SHIFT CONTROL MECHANISM

[75] Inventor: Robert W. Wolfe, Jackson, Mich.

[73] Assignee: Clark Equipment Company, Buchanan, Mich.

[21] Appl. No.: 771,230

[22] Filed: Feb. 23, 1977

[51] Int. Cl.² .................... G05G 5/12; G05G 7/00
[52] U.S. Cl. .................... 74/475; 74/10.15;
74/473 R; 74/533; 74/538
[58] Field of Search ........... 74/473 R, 475, 533,
74/534, 535, 538, 10.15

[56] References Cited

U.S. PATENT DOCUMENTS

| | | | |
|---|---|---|---|
| 1,976,309 | 10/1934 | Thomson | 74/475 |
| 3,665,775 | 5/1972 | Freeman | 74/473 R |
| 3,800,614 | 4/1974 | Johnson | 74/577 M X |
| 3,874,248 | 4/1975 | Hauser et al. | 74/475 |
| 3,941,008 | 3/1976 | Cambria | 74/475 X |

*Primary Examiner*—Allan D. Herrmann
*Attorney, Agent, or Firm*—Ernst H. Ruf

[57] ABSTRACT

In a manually operable shift control mechanism operatively connected with a transmission through shifting means wherein a shift lever controls a preselector valve means for selectively establishing one of a multiplicity of consecutively arranged speed ratios in the transmission, an escapement assembly including an arcuate control member, affixed to the shift control housing, having a multiplicity of detent cut-outs corresponding with the angular location but exceeding the number of the transmission settings; an escapement latch pivotally secured to the shift lever and having allochiral tooth portions alternately capable of entering into one of the detent cut-outs to cause at least momentary interference between the control member and the escapement latch; and bias means for sequentially pivoting and again centering the escapement latch relative to the control member for each transmission setting, whereby all but the slowest movement of the shift lever will cause a momentary entry and subsequent momentary interference between the control member and the escapement latch, thereby producing sequential single-step shifts of the transmission. Means for centering the shift lever relative to the detent cut-outs as well as providing distinct operator "feel" and escapement override means are also set forth.

20 Claims, 5 Drawing Figures

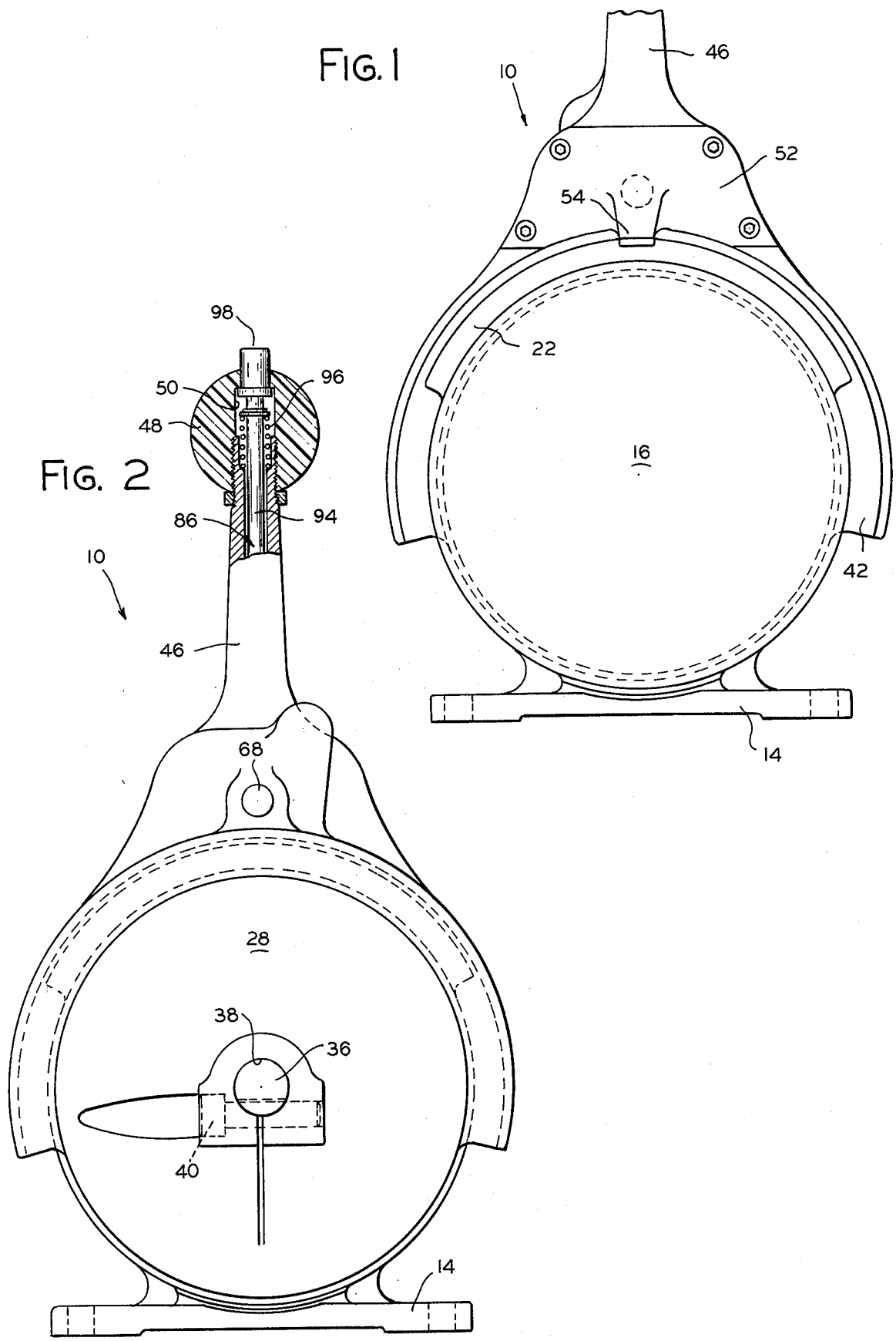

ESCAPEMENT ASSEMBLY FOR SHIFT CONTROL MECHANISM

BACKGROUND OF THE INVENTION

1. Field Of The Invention

The field of art to which this invention pertains includes a manually operable shift control mechanism and more particularly an escapement assembly for producing sequential single-step shifts of the transmission, with escapement override means also permitting rapid multi-step shifting if so desired.

2. Description Of The Prior Art

Co-pending application Ser. No. 731,391, of Robert W. Wolfe, filed Oct. 12, 1976, which is also assigned to the assignee of the present invention, discloses a novel shift control system for a multiple input transmission that is preferably used with the multiple input transmissions set forth in U.S. Pat. No. 4,000,662, issued Jan. 4, 1977. The transmissions set forth in said patent all have a multiple input portion and a multiple output portion, each of which in turn contains a plurality of constant-mesh change speed gears to provide for a plurality of drive ratios in response to movement of an operator's shift lever or the like.

The multiple use of the gears of this transmission requires a sophisticated shift control system, especially if this system is of the preselector or semi-automatic type wherein shifts between drive ratios are made in response to the movement of an operator's shift lever and the release of the torque on the drive train. Since the transmission is indirectly controlled by the shift control mechanism, it is preferred that the shift control mechanism afford the operator a distinct "feel" for each transmission setting. In addition, the shift control mechanism should provide the operator with means for readily obtaining the next transmission setting (either upshifting or downshifting) without difficulty and without requiring visual contact with the selector lever.

Examples of prior art patents which include control systems with escapement means include U.S. Pat. Nos. 3,874,248 to Hauser et al; 1,976,309 to Thomson; and 3,800,614 to Johnson.

SUMMARY OF THE INVENTION

The invention contemplates a shift control mechanism that is easily maneuverable through an uncomplicated pattern to the selected settings, that incorporates a novel escapement assembly for readily obtaining sequential single-step shifts, and releaseably maintains each selected setting, as well as affording a distinct operator "feel". In addition, escapement override means permit rapid multiple-step shifts if so desired.

More particularly, the invention seeks to provide a shift control mechanism having an escapement assembly that is especially suited for operating a vehicle transmission and has detent means directly coacting with the shift control lever to produce sequential single-step shifts and to releaseably maintain the chosen settings. Additionally, the shift control mechanism includes operator-actuated escapement assembly override means for fully arresting the movement of the escapement assembly pivot plate, thereby permitting multi-step shifts.

In summary, the escapement assembly for the shift control mechanism of this invention includes an arcuate control member mounted on the transmission shift control housing, with the control member having a plurality of spaced detent cut-outs that correspond with the angular location but exceed the number of a multiplicity of consecutively arranged transmission settings that respectively correspond to the transmission speed ratios. A pivot plate, pivotally secured to the transmission shift lever, has allochiral tooth portions that are alternately capable of entering into one of the detent cut-outs upon pivoting of the pivot plate so as to cause at least momentary interference between the control member and the pivot plate. An escapement spring, operatively interposed between the control member and the pivot plate sequentially pivots and subsequently again centers the pivot latch relative to the control member for each transmission setting, with all but the slowest movement of the shift lever causing momentary entry and subsequent momentary interference between the pivot plate and the control member. Means for centering the shift lever relative to the detent cut-outs after each shift terminate the momentary interference so that the escapement spring can again center the pivot plate relative to the control member.

The escapement assembly of this invention also includes escapement override means for arresting all pivotal movement of the pivot plate so as to permit rapid multi-shifts of the transmission.

The number of spaced detent cut-outs exceeds the number of in-gear and neutral positions of the transmission by at least two positions on each end of the control member.

Further set forth in the specification are details for shifting the transmission from one drive ratio to another and how the centering means affords a distinct "feel" to the operator for each transmission setting.

The principal objects, features and advantages of this invention will be more readily understood by persons skilled in the art when following the detailed description in conjunction with the several drawings.

BRIEF DESCRIPTION OF THE DRAWINGS

FIG. 1 is a partial front elevational view of a shift control mechanism embodying the escapement assembly of this invention.

FIG. 2 is a full rear elevational view of the shift control mechanism.

DESCRIPTION OF THE PREFERRED EMBODIMENT

Figure 5:
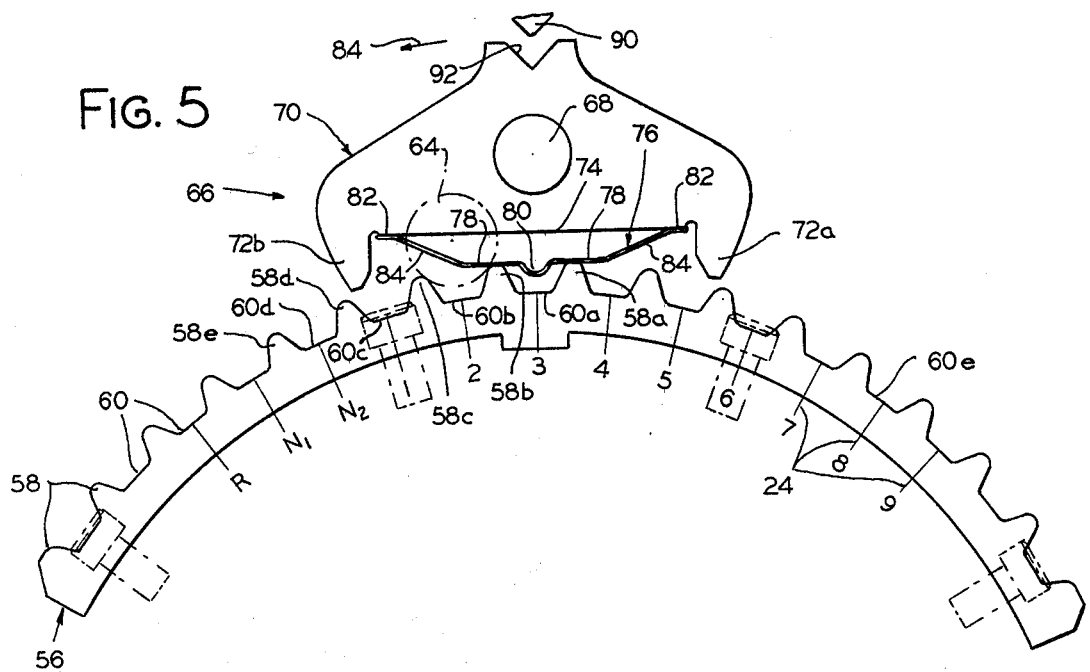
FIG. 5 is an enlarged view of the escapement assembly components.

Referring now to the drawings in detail, numeral 10 denotes generally a shift control mechanism which is preferably used in a shift control system for a multiple input transmission set forth in co-pending U.S. patent application No. 731,391 filed Oct. 12, 1976, which is also assigned to the assignee of this invention. In turn, the shift control system set forth in said co-pending application is preferably used with the multiple input transmission set forth in U.S. Pat. No. 4,000,662, issued Jan. 4, 1977, which again is assigned to the assignee of this invention. The transmission set forth in U.S. Pat. No. 4,000,662 has a multiple input portion and a multiple output portion, each of which in turn contains a plurality of constant-mesh change speed gears to provide for a plurality of drive ratios in response to movement of an operator's shift lever or the like.

Figure 3:
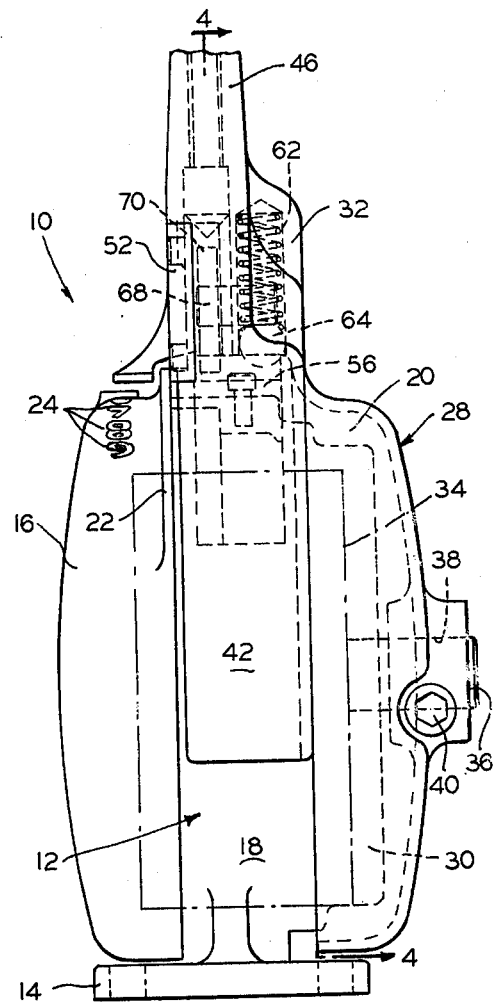
FIG. 3 is a partial side elevational view of the shift control mechanism.

As best seen in FIGS. 1–3, shift control mechanism 10 includes a main housing 12 having an apertured base or support portion 14, a generally circular dished or cupped front surface 16 that merges into a generally cylindrical center surface 18 (FIG. 3) and a rear surface portion 20 (FIG. 3).

A portion of the intersection between dished surface 16 and center surface 18 is provided with a radial flange portion 22, with a portion of dished surface 16, adjacent to flange portion 22, being provided with a plurality of transmission setting legends 24 as best seen in FIG. 3. The numerals or letters that make up transmission setting legends represent the various forward, neutral and reverse speed settings of the transmission.

Superimposed over main housing rear surface portion 20 is a generally circular dished or cupped main housing cover 28, which together with main housing 12 defines a central cavity 30 therebetween. Cavity 30 contains manual preselector valve means 34 (shown in phantom lines in FIG. 3), with valve means 34 forming no part of this invention and may, for example, take the form of a rotary valve having a plurality of ports that are so arranged so as to permit pressurizing and venting in order to accomplish the desired shifting of the selector rods of the transmission shown in U.S. Pat. No. 4,000,662. Valve means 34 which is physically secured to main housing 12 is provided with an outwardly extending rotatable shaft or control member 36, with housing cover 28 being fixedly secured on shaft 36, for pivoting therewith, via bore 38 and attachment means 40.

Main housing cover 28 also includes a generally semi-cylindrical arcuate flange portion 42 which overlies and is radially spaced from, as well as concentric with, main housing cylindrical center surface 18. A center area of flange portion 42 extends outwardly therefrom and together with housing cover extension 32 defines a cavity 44 best seen in FIG. 4. The side walls of cavity 44 in turn merge into or are connected to a centrally apertured control or selector lever 46 whose outer end is fitted with shift knob 48 having a stepped central aperture 50.

Cavity 44 is closed by a cover plate 52 which is provided with a depending position indicator 54 which in turn is designed to successively overlie one transmission setting legend and thereby indicate the particular transmission setting selected by the operator by pivoting selector lever 46 and consequently housing cover 28 relative to main housing 12.

Let it be assumed, that, for example, shift control mechanism 10 is utilized for controlling an embodiment of the transmissions set forth in U.S. Pat. No. 4,000,662 which has nine speeds forward, two neutral settings and one reverse speed in the manner shown by transmission legends 24 in FIG. 5. In order to afford a distinct "feel" to the operator for each transmission setting, an arcuate externally-toothed control member 56 is rigidly attached to main housing center surface 18 inwardly of main housing flange portion 22 in the manner so as to be slightly radially spaced from housing cover flange portion 42 and cavity 44. Control member 56 is provided with a plurality of tooth-like members 58, with each two of these adjacent members defining a detent cut-out 60 therebetween. As will become clear as this description progresses, detent cut-outs 60, which are spaced about $7\frac{1}{2}°$ apart, correspond in location with the transmission shift or setting legends and in number exceed the number of transmission shift legends by at least two settings on each end of control member 56. Partially contained in bore 62, adjacent to cavity 44, is spring biased detent member or ball 64, with the latter being biased into engagement with successive ones of detent cut-outs 60 as selector lever 46 is moved relative to main housing 12. As ball 64 moves over tooth-like members 58 into adjacent detent cut-outs 60, it affords a distinct "feel" to the operator for each transmission setting.

Escapement assembly 66 provides the operator of the transmission with means for readily obtaining the next transmission setting (either upshifting or downshifting) without difficulty. Almost any speed of movement of lever 46, except for a very slow movement, will result in only a single-step shift. Pivoted in cavity 44, on one end of pin 68 secured to main housing cover extension 32, is escapement latch or pivot plate 70 having two spaced outwardly or downwardly depending allochiral toothed portions 72a, 72b. Confined to a relieved flat surface 74 between the toothed portions 72a, 72b are both ends 82 of downwardly extending bias means 76 which preferably takes the form of an undulating allochiral escapement spring having leg portions 84 and contact portions 78, the latter being in biasing abutment with the crown portions of two adjacent tooth-like members 58 of control member 56. Interposed between spring contact portions 78 and entering into and centered relative to, for example, detent cut-out 60a between members 58a and 58b, is bias means center cam portion 80.

Figure 4:
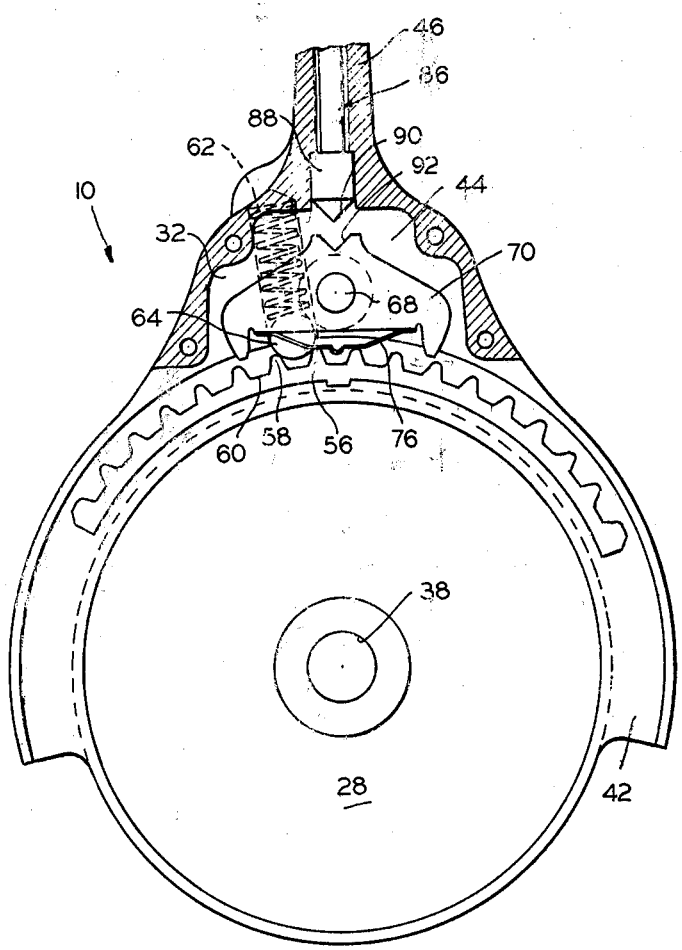
FIG. 4 is a simplified vertical sectional view, taken generally along line 4—4 of FIG. 3, which shows the escapement assembly mounted in the shift control mechanism.

In the operation of selector lever 46 (which operation may be bidirectional), if selector lever 46 is moved in an arc, for example, counterclockwise in the direction of arrow 84 in FIG. 4, causes bias means center cam portion 80 to abut tooth-like member 58b and thereby deflect bias means 76 as cam portion 80 abuts and passes over member 58b which in turn causes the inward or counterclockwise pivoting of pivot plate toothed portion 72b into detent cut-out 60d. Thus, if the operator attempts anything but a very slow movement, the leading edge of toothed portion 72b will physically abut the leading edge of tooth-like member 58e and thereby impede further movement until the operator releases his thrust on selector lever 46. Thereafter, detent member 64 will center lever 46 relative to detent cut-out 60c and unload pivot plate 70 so that escapement spring 76 can again center the pivot plate and thereby disengage the leading edge of toothed portion 72b from its abutment with the leading edge of member 58e.

As best seen in FIG. 5, bias means center cam portion 80 is located in detent cut-out 60a which also represents the third gear location, while detent member 64 is located in adjacent detent cut-out 60b, whereas pivot plate toothed portion 72b is located above detent cut-out 60c. Thus it can be seen that even though bias means center cam portion 80 is in the detent cut-out corresponding to the actual gear setting, an adjacent detent cut-out 60b is required for detent member 64 and a yet further adjacent detent cut-out 60c is required for the possible interaction of toothed member 58d with toothed portion 72b during the shifting from the fourth to the third gear setting. Therefore, it should be clear that two additional detent cut-outs 60 are required on each end of control member 56 to accommodate detent member 64 and one of toothed portions 72a, 72b. The spacing of toothed portions 72a, 72b is at least a partial result of the axial extent of bias means 76 which in turn is dictated by the required amount of pivoting of escapement latch 70 to achieve the noted physical abutment.

Assuming, for example, that shift control mechanism 10 is in the ninth gear setting, i.e., that detent member 64 is in detent cut-out 60e, it would be rather cumbersome to shift back to the first gear setting methodically through the intermediate gear settings, which would be required since otherwise pivot plate toothed portion 72b would progressively interact with tooth-like members 58 between the ninth and first gear settings. Therefore, in order to permit rapid downshifting (or upshifting, for that matter), shift control mechanism 10 is provided with escapement latch override means 86 which includes override plunger 88 whose angular tip 90 is designed to interact with pivot plate notch 92 to fully arrest all movement of pivot plate 70. Relieved surface 74 of pivot plate 70 permits the ready vertical displacement of bias means center cam portion 80 and contact portions 78 via tooth-like members 58. Override plunger 88 is attached to plunger rod 94 which in turn is normally spring biased to disengaged positions by spring means 96 in shift knob 48. Plunger 88 is manually biased into engaged position via override button 98 extending from shift knob aperture 50.

Thus, escapement assembly 66 includes arcuate, toothed control member 56, bias means 76 and escapement latch or pivot plate 70. Control member 56 further interacts with biased detent member 64 so as to center the position indicator 54 relative to the selected transmission setting and to both provide the desired operator "feel" as well as unloading latch 70 so that it can again be centered by bias means 76. Escapement override means 86 includes plunger 88, biased rod 94 and button 98, with plunger tip 90 of course interacting with pivot plate notch 92.

It should, of course, be understood that shift control mechanism 10 is mounted within each reach of the operator at an operator control station (not shown) in any desired position.

From the foregoing, it is believed that those familiar with the art will recognize and appreciate the novel concepts and features of the escapement assembly and escapement override means for a transmission shift control mechanism. Obviously, while the invention has been described in relation to only a single preferred embodiment, numerous variations, changes and substitutions of equivalents will present themselves to persons skilled in the art and may be made without necessarily departing from the scope and principles of this invention. Consequently, the scope of this invention should be determined solely by reference to the claims appended hereto.

What is claimed is:

1. In a transmission shift control mechanism having a main housing, means for shifting a transmission, and a shift lever, movable in an arc, for controlling said shifting means through a plurality of settings corresponding in number to the number of in-gear and neutral positions of said transmission, wherein the improvement takes the form of an escapement assembly comprising:

a. a control member mounted on said housing, said control member having an arcuate surface provided with a plurality of spaced detent cut-outs corresponding to the location of said in-gear and neutral positions of said transmission and in number exceeding said number of in-gear and neutral positions;

b. an escapement latch pivotally secured to said shift lever, each end of said escapement latch including a depending portion, one or the other of which, depending on the direction of movement of said shift lever, is capable of entering into one of said detent cut-outs, upon pivoting of said escapement latch so as to inhibit further movement of said shift lever; and c. bias means operatively interposed between said control member and said escapement latch for sequentially pivoting and then again centering said escapement latch relative to said control member for each of said in-gear and neutral positions of said tranmission, whereby all but the slowest movement of said shift lever will cause a momentary entry and subsequent momentary interference between said escapement latch and one of said detent cut-outs, thereby producing sequential single-step shifts of said transmission.

2. The escapement assembly of claim 1 wherein a number of said spaced detent cut-outs exceeds the number of in-gear and neutral positions by at least two positions on each end of said control member.

3. The escapement assembly of claim 1 wherein said detent cut-outs are defined between adjacent ones of a plurality of angularly spaced radially outwardly extending tooth-like members, and the depending portions of said escapement latch take the form of two spaced allochiral toothed portions facing in a direction toward said tooth-like members.

4. The escapement assembly of claim 3 wherein said bias means takes the form of an undulating allochiral escapement spring whose ends are confined by a relieved surface between said escapement latch toothed portions.

5. The escapement assembly of claim 4 wherein said escapement spring further includes opposed contact portions in biasing abutment with the crown portions of two adjacent tooth-like members of said control member when said escapement latch is centered relative to said control member.

6. The escapement assembly of claim 5 wherein said escapement spring also includes a center cam portion between said spring contact portions, said center cam portion extending into the detent cut-out defined by said two adjacent tooth-like members in biasing abutment with said spring contact portions, when said escapement latch is centered relative to said control member.

7. The escapement assembly of claim 6 wherein movement of said shift lever through a predetermined angle will cause said spring center cam portion to abut one of said adjacent tooth-like members and thereby deflect said escapement spring as said center cam portion abuts and passes over said adjacent tooth-like member, which in turn causes pivoting of one of said escapement latch toothed portions into a detent cut-out at least three positions removed from the detent cut-out occupied by said center cam portion when said escapement latch was centered relative to said control member.

8. The escapement assembly of claim 1 further including means for centering said shift lever relative to said detent cut-out means after each shift, said centering of said shift lever in turn terminating said momentary interference between said escapement latch and one of said detent cut-outs so that said bias means can again center said escapement latch relative to said control member.

9. The escapement assembly of claim 8 wherein said centering means includes a spring biased detent member partially contained within a bore in said shift lever and biased into engagement with successive ones of said detent cut-outs as said shift lever is moved relative to said main housing, said centering means further affording a distinct "feel" to the operator for each transmission setting.

10. The escapement assembly of claim 1 further including escapement override means for arresting all pivotal movements of said escapement latch so as to permit rapid multi-step shifts of said transmission.

11. The escapement assembly of claim 10 wherein said escapement override means comprises:
   a. a contact surface on the centerline of said escapement latch;
   b. a plunger having a tip adapted to operatively interact with said escapement latch contact surface;
   c. means for normally biasing said plunger into a disengaged position relative to said escapement latch; and
   d. an operator-actuated means for manually overriding said biasing means.

12. The escapement override means of claim 11 wherein said contact surface is a notch, said plunger is located within said shift lever, and said operator-actuated override means takes the form of an override button extending from an aperture in a shift lever control knob.

13. In a manually operable shift control mechanism having means for shifting a transmission, a main housing containing preselector valve means, a shift lever for controlling said preselector valve means for selectively establishing one of a multiplicity of consecutively arranged speed ratios in a transmission, an escapement assembly comprising in combination:
   a. a control member affixed to said housing, said control member having an arcuate outer surface provided with a multiplicity of detent cut-outs that are spaced so as to correspond with the angular location but exceed the number of a multiplicity of consecutively arranged transmission settings respectively corresponding to said transmission speed ratios;
   b. a pivot plate pivotally secured to said shift lever, said pivot plate including allochiral tooth portions alternately capable of entering into one of said detent cut-outs upon pivoting of said pivot plate thereby causing at least a momentary interference between said control member and said pivot plate;
   c. an escapement spring confined between said pivot plate tooth portions and in operative contact with said control member for sequentially pivoting and subsequently again centering said pivot latch relative to said control member for each of said transmission settings; and
   d. means for centering said shift lever relative to said detent cut-outs after each shift, the centering of said shift lever terminating said momentary interference between said control member and said pivot plate so that said escapement spring can again center said pivot plate relative to said control member, whereby said at least momentary interference limits the degree of angular movement of said shift lever to produce sequential single-step shifts of said transmission.

14. The combination of claim 13 wherein the number of said spaced detent cut-outs exceeds the number of transmission settings by at least two settings on each end of said control member.

15. The combination of claim 13 wherein said detent cut-outs are defined between adjacent ones of a plurality of angularly spaced radially outwardly extending tooth-like members, with the tooth portions of said pivot plate facing in a direction toward said tooth-like members.

16. The combination of claim 15 wherein said escapement spring includes opposed contact portions in biasing abutment with the crown portions of two adjacent tooth-like members of said control member when said pivot latch is centered relative to said control member.

17. The combination of claim 16 wherein said escapement spring also includes a center cam portion between said spring contact portions, the former extending into a detent cut-out when said pivot latch is centered relative to said control member.

18. The combination of claim 13 wherein said centering means includes a spring biased detent member partially contained within a bore in said shift lever and biased into engagement with successive ones of said detent cut-outs as said shift lever is moved relative to said main housing, said centering means affording a distinct "feel" to the operator for each transmission setting.

19. The combination of claim 13 further including escapement override means for arresting all pivotal movement of said pivot plate so as to permit rapid multi-step shifts of said transmission.

20. The combination of claim 19 wherein said escapement override means includes:
   a. a contact surface on the centerline of said pivot plate;
   b. a plunger having a tip adapted to operatively interact with said pivot plate contact surface;
   c. means for normally biasing said plunger into a disengaged position relative to said pivot plate; and
   d. operator-actuated means for manually overriding said biasing means.

* * * * *